J. FERRER & E. ALONSO.
ROTARY VALVE.
APPLICATION FILED AUG. 8, 1914.
1,157,684.
Patented Oct. 26, 1915.
3 SHEETS—SHEET 3.
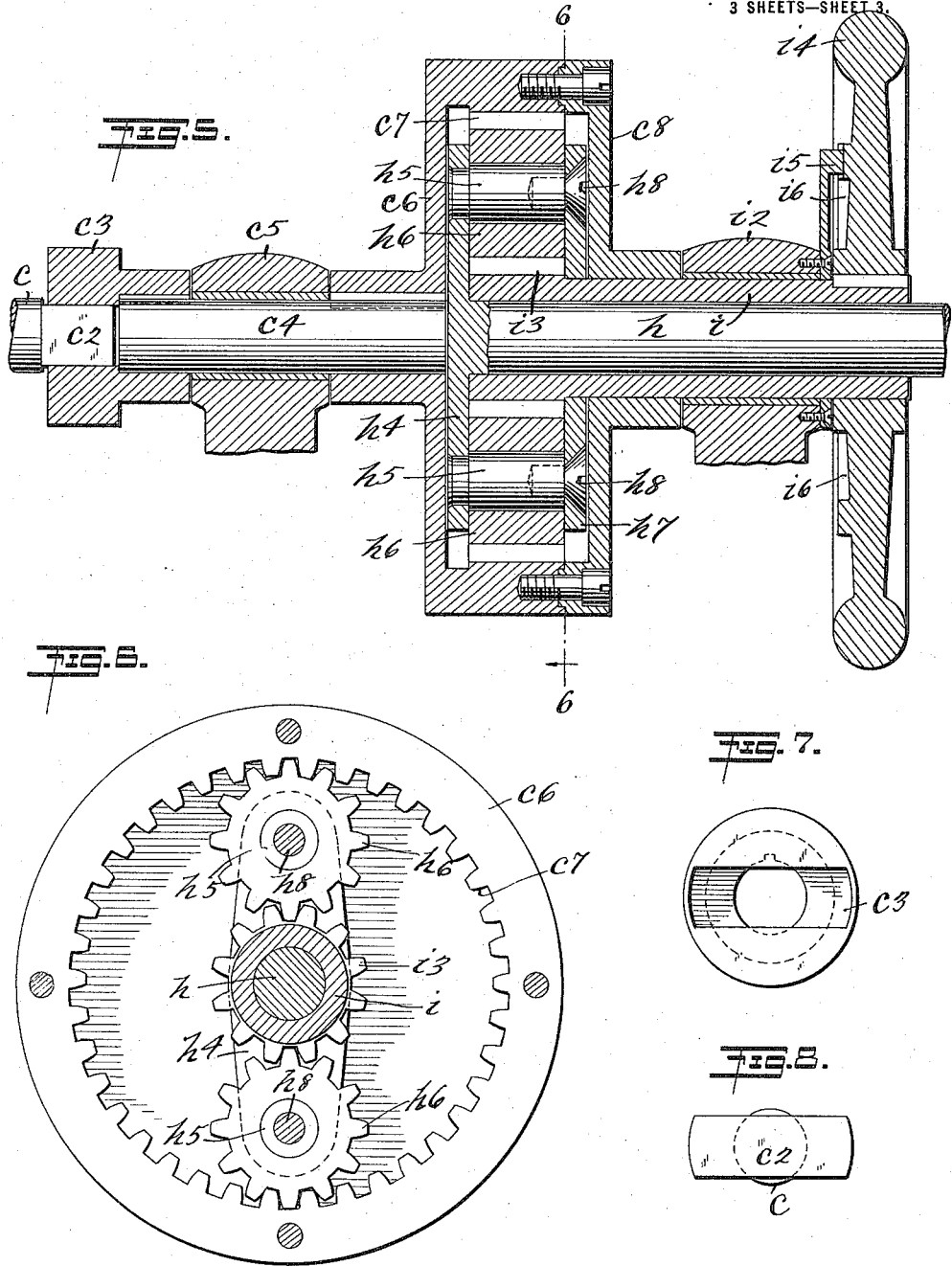

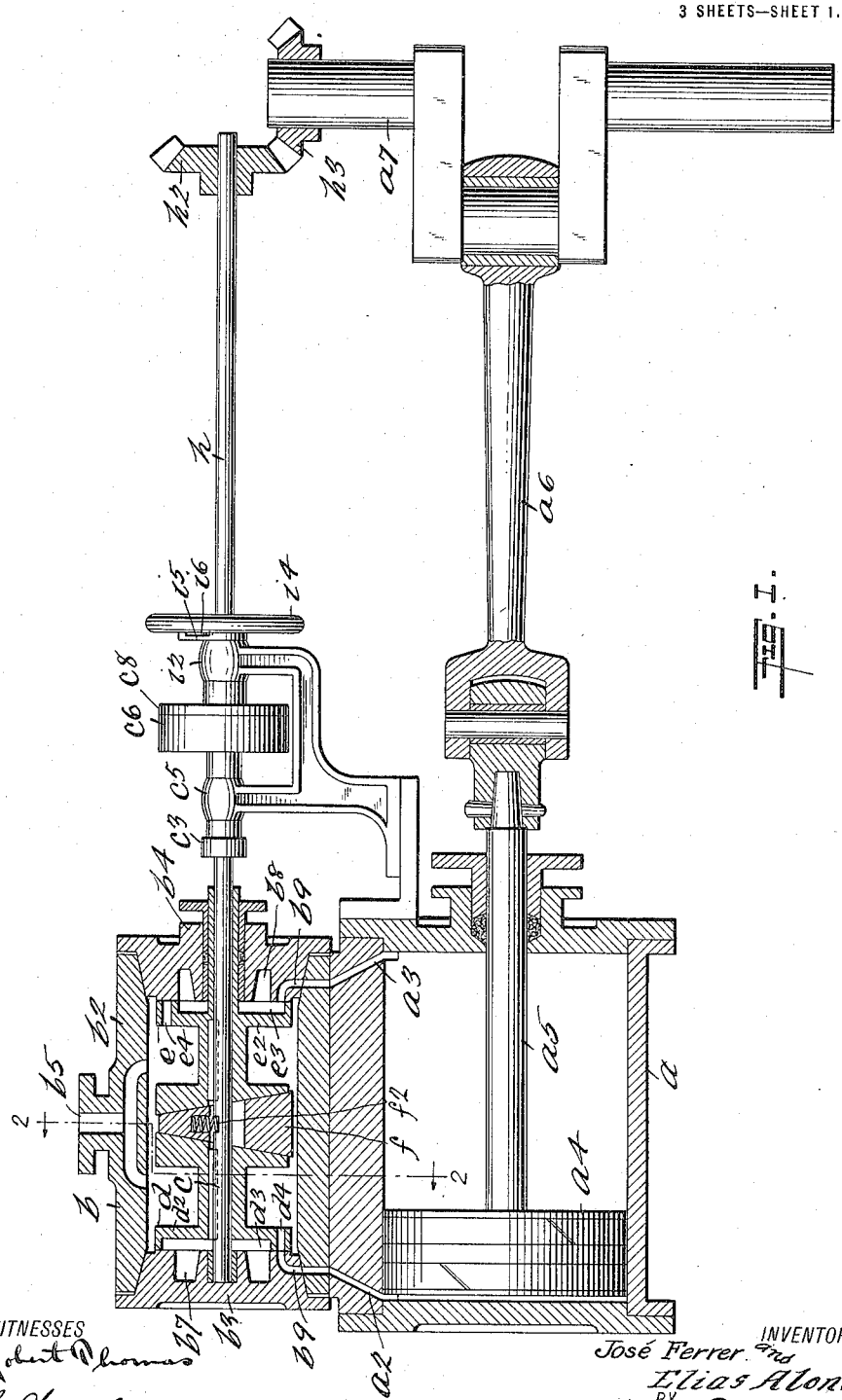

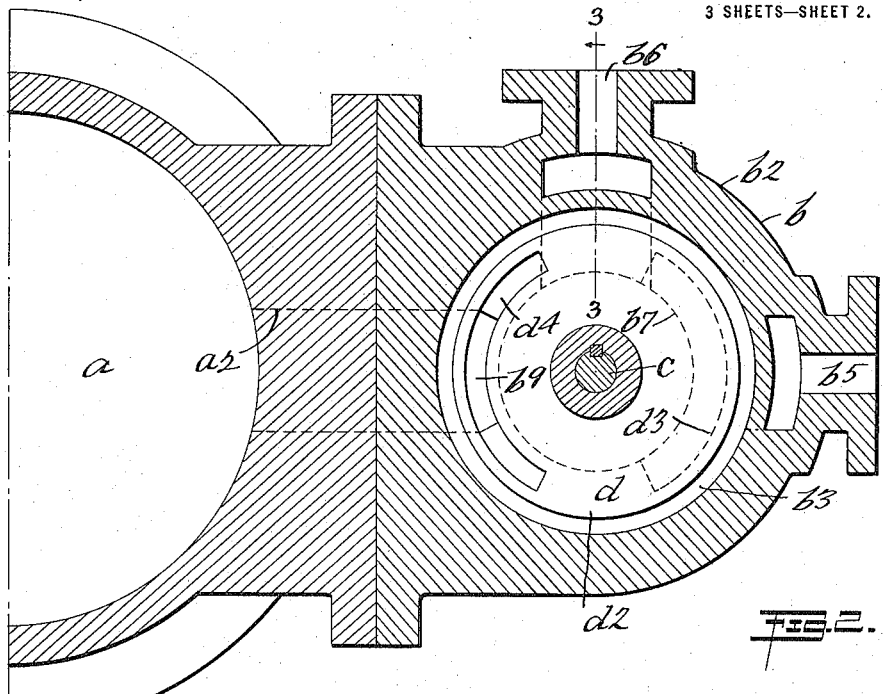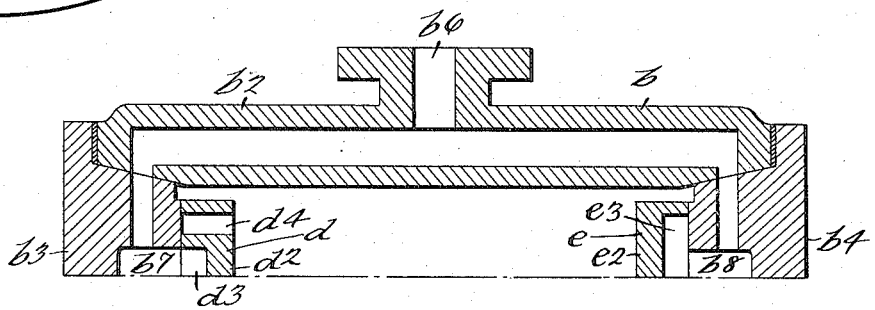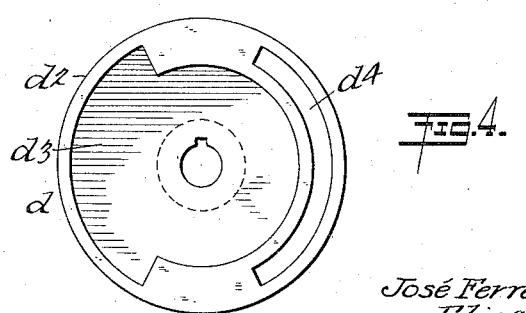

UNITED STATES PATENT OFFICE.

JOSÉ FERRER AND ELIAS ALONSO, OF SAN JUAN, PORTO RICO.

ROTARY VALVE.

1,157,684.  Specification of Letters Patent.  Patented Oct. 26, 1915.

Application filed August 8, 1914. Serial No. 855,895.

*To all whom it may concern:*

Be it known that we, JOSÉ FERRER, an American citizen, and ELIAS ALONSO, a citizen of Cuba, and residents of San Juan, in the district of San Juan and Island of Porto Rico, have invented certain new and useful Improvements in Rotary Valves, of which the following is a specification.

Our invention relates to steam engines, and the main object thereof is to provide a rotary substitute for the present reciprocating valve now used in such engines; a further object is to provide a separate valve for each end of the cylinder but revoluble with a shaft common to both; a further object is to provide means for compensating for the wear on either or both of the valves; a further object is to provide in each valve distinct inlet and exhaust passages adapted for alternate communication with the corresponding cylinder ports; and further objects are to provide such valve mechanisms which are simple in construction and installation, positive in operation, and well adapted for the purposes for which they are designed.

Our invention is fully described in the following specification, of which the accompanying drawings form a part, in which the same reference characters are used to designate the same parts in each of the veiws, and in which:—

Figure 1 is a central, longitudinal, horizontal, section taken through a steam engine provided with a present preferred form of our rotary valve; Fig. 2 is an enlarged section taken on the line 2—2 of Fig. 1; Fig. 3 is a section taken on the line 3—3 of Fig. 2, of fragmentary form; Fig. 4 is a face view of a valve which we employ, removed from the engine; Fig. 5 is an enlarged, central, longitudinal, section taken on the line 5—5 of Fig. 1; Fig. 6 is a section taken on the line 6—6 of Fig. 5; and Figs. 7 and 8 are views of a detail of the valve-shaft construction.

In the drawings forming a part of this application we have shown a cylinder $a$ of a steam engine of the reciprocating type, provided with ports $a^2$ and $a^3$, a piston $a^4$, a rod $a^5$ therefor, a connecting rod $a^6$, and a crank-shaft $a^7$, all of the usual or any desired construction, and we provide a steam-chest $b$ at one side of said cylinder.

The chest $b$ consists of a cylindrical member $b^2$ having removable ends $b^3$ and $b^4$, the contacting surfaces of which, and of the cylindrical member $b^2$, being ground to provide a steam tight joint, and the member $b^2$ is provided with a branched steam inlet port $b^5$ and with a branched exhaust port $b^6$ the branches of which, as shown in Fig. 3, communicate with recesses $b^7$ and $b^8$ of the ends $b^3$ and $b^4$, respectively said ends being also provided with a passage $b^9$, each, in register with the cylinder ports $a^2$ and $a^3$, as clearly shown in Fig. 1.

Rotatable in the steam-chest $b$ is a longitudinally arranged valve-shaft $c$ which is preferably transversely and angularly formed at its outer end, as shown at $c^2$, Figs. 5, 7 and 8, to fit into a similarly recessed coupling $c^3$ keyed to a short shaft $c^4$ rotatable in bearings $c^5$, and to which, in turn, is keyed a casing $c^6$ provided with an internal gear $c^7$ and a cover $c^8$, revoluble with the valve-shaft $c$.

Keyed on the valve-shaft $c$ are two oppositely disposed valves $d$ and $e$, spaced apart in the center of the steam-chest and similarly inclined on adjacent faces for a wedge $f$ arranged therebetween, and movable against the inclined planes by means of a spring $f^2$, and the object of which is to force the said valves apart, when worn at their ends, to compensate for such wear automatically, and in no way interfering with the functions of the valves but, instead, assisting the same.

The valve $d$ comprises a disk $d^2$ having a recess $d^3$ in the outer face thereof, as clearly shown in Fig. 4, of an arc of a circle exceeding 120 degrees for a concentric portion the radius of which equals the radius of the arc on which the passage $b^9$ of the end $b^3$ is struck whereby said recess will register with said passage for a corresponding degree of valve revolution, and said valve is also provided with a concentric slot $d^4$, diametrically opposite the concentric portion of the recess $d^3$, entirely through the disk $d^2$ and of the same radius as the passage $b^9$ referred to, and of an arc exceeding 120 degrees of a circle, whereby said slot will register with said passage for a corresponding degree of valve revolution, said slot communicating with the interior of the steam chest, and it will thus be seen that the recess $d^3$ and slot $d^4$ are alternately carried into register with said passage, and thus into communication with the interior of the cylinder $a$, in each valve revolution, to admit steam to said cylinder when said slot is in communication therewith, and to exhaust the expanded steam when said recess is in communication therewith.

The valve $e$ is in all respects similar to the valve $d$, having the disk $e^2$, recess $e^3$, and slot $e^4$, adapted, each, to register with the passage $b^9$ of the end $b^4$, alternately, and thus adapted to exhaust or to admit steam from and to said cylinder on the opposite side of the piston $a^4$ from that in communication with the valve $d$, and it will be noted that the slots $d^4$ and $e^4$ are oppositely arranged whereby one slot and one recess of the two valves are in register at one time with the corresponding passage $b^9$, or vice-versa.

By reference to Figs. 5 and 6, it will be seen that the casing $c^6$ supports one end of a gear-shaft $h$ provided with a bevel pinion $h^2$ at its opposite end enmeshed with a similar pinion $h^3$ on the crank-shaft $a^7$, and whereby said gear-shaft $h$ is rotated, and said gear-shaft also carries, within the casing $c^6$, an integral disk $h^4$ having stub-shafts $h^5$ secured therein and diametrically opposite each other, and serving as supports for freely revoluble spur pinions $h^6$ which are in mesh with the internal gear $c^7$ of the casing $c^6$ and, by reference to Fig. 5, it will be seen that we provide a ring $h^7$ connected with the stub-shafts $h^5$ by means of screws $h^8$ to maintain said stub-shafts and spur pinions in stability.

Projecting through the cover $c^8$ of the casing $c^6$ is a sleeve $i$ revoluble therein and on the gear-shaft $h$, as also in the support $i^2$, said sleeve carrying a spur pinion $i^3$ at its inner end in mesh with the pinions $h^6$, a planetary gear thus resulting, and a hand-wheel $i^4$ is provided at the outer end of said sleeve, preferably by means of a ratchet and pawl connection with a plate $i^5$ secured to the bearing support $i^2$, as shown at $i^6$, the details of this feature not being illustrated as any suitable form or equivalent may be employed to hold the handwheel against movement with the gear-shaft $h$, but said handwheel is manually revoluble in a direction opposite to that of the said shaft, for reversing the valve positions from those previously occupied, to reverse the engine.

The operation is very simple; the steam enters the inlet port $b^5$, passes thence to the left end of the cylinder $a$ through slot $d^4$, passage $b^9$, and port $a^2$, and the piston is forced outwardly, actuating the crank-shaft $a^7$ through an arc of 180 degrees, and thereby rotating the gear-shaft $h$ the same degree, by means of the bevel pinions $h^2$ and $h^3$; the shaft $h$ revolves the casing $c^6$, through the medium of the internal gear $c^7$ and the rotatable pinions $h^6$ in mesh therewith and with the normally stationary pinion $i^3$, it being our intention to provide a pinion relationship insuring a full casing $c^6$ revolution to a full rotation of the gear-shaft $h$, thus rotating the shafts $c^4$ and $c$ at the same speed as the shaft $h$ and thus of the crank-shaft $a^7$, and, in a full outward piston movement, the valves $d$ and $e$ are turned through an arc of 180 degrees, whereby steam now enters the cylinder through the slot $e^4$ and the piston returns to the initial position shown.

In the forward piston movement the air, at first, and expanded steam is forced through the port $a^3$, passage $b^9$, and recess $e^3$ to the corresponding branch of the exhaust port $b^6$, outwardly of the engine, and in the opposite piston movement, the steam is exhausted through port $a^2$, passage $b^9$, recess $d^3$, and port $b^6$, and the live steam is therefore admitted to the cylinder at each cylinder end alternately, and the expanded steam exhausted from the opposite ends alternately.

If it is desired to reverse the engine while running, all that is necessary is to revolve the hand-wheel $i^4$ in such manner as to bear a relationship with the gear-shaft $h$ of 180 degrees, thus carrying the pinions $h^6$ around the pinion $i^3$ in like degree, and thereby revolving the casing $c^6$, shaft $c^4$, shaft $c$ and valves $d$ and $e$ through the same arc, and the admission and exhausting of steam is changed to opposite cylinder ends and the engine is reversed.

By means of the arrangement of the valves as shown we entirely avoid the retardation thereof common to other valves and which is due to the steam pressure; there is no pressure under our valves, as only the "dead" steam passes thereunder, and a perfectly balanced valve action results, free from the vibrations of reciprocating valves, and therefore very smooth in action; further, we provide automatic means for compensating for wear of the valves, and which means also insure a steam-tight engagement of the valves with the stationary parts against which they impinge and on which they move.

While we have shown our rotary valve applied to a horizontal engine, we are not limited thereto, as we may apply the same to any type, and we also reserve the right to make changes in the details shown and described, within the scope of the following claim, which will not depart from the spirit of our invention or sacrifice its advantages.

Having fully described the invention, what we claim as new, and desire to secure by Letters Patent, is:—

In an engine, a cylinder having a port at each end thereof, a piston therein, a steam-chest provided with a steam inlet and a steam outlet port, a rotary valve, comprising two similar, oppositely disposed, members having inclined adjacent ends, a wedge arranged between said inclined ends, means for forcing said wedge inwardly to move said members apart, and means for rotating said members, said valve being adapted to communicate said steam-chest ports with said cylinder ports, alternately.

In testimony that we claim the foregoing as our invention we have signed our names in presence of the subscribing witnesses.

JOSÉ FERRER.
ELIAS ALONSO.

Witnesses:
EUGENIO FIOL,
C. SURE PRAELS.